US008928494B2

(12) United States Patent
Aivas et al.

(10) Patent No.: US 8,928,494 B2
(45) Date of Patent: Jan. 6, 2015

(54) PARKING METHOD AND SYSTEM

(71) Applicants: Matan Aivas, Givat Zeev (IL); Ori Danieli, Givat Zeev (IL)

(72) Inventors: Matan Aivas, Givat Zeev (IL); Ori Danieli, Givat Zeev (IL)

( * ) Notice: Subject to any disclaimer, the term of this patent is extended or adjusted under 35 U.S.C. 154(b) by 0 days.

(21) Appl. No.: 13/719,283

(22) Filed: Dec. 19, 2012

(65) Prior Publication Data

US 2014/0062727 A1 Mar. 6, 2014

Related U.S. Application Data

(60) Provisional application No. 61/694,272, filed on Aug. 29, 2012.

(51) Int. Cl.
*B60Q 1/48* (2006.01)
*G08G 1/14* (2006.01)

(52) U.S. Cl.
CPC ................ *G08G 1/144* (2013.01); *G08G 1/146* (2013.01)
USPC ........................................................ 340/932.2

(58) Field of Classification Search
CPC ....... G08G 1/14; G08G 1/0969; G08G 1/144; G08G 1/147; G08G 1/146; G06Q 30/0284
USPC ........................................................ 340/932.2
See application file for complete search history.

(56) References Cited

U.S. PATENT DOCUMENTS

| | | | | |
|---|---|---|---|---|
| 7,516,010 | B1 * | 4/2009 | Kaplan et al. | 340/932.2 |
| 7,783,530 | B2 * | 8/2010 | Slemmer et al. | 340/932.2 |
| 2010/0228667 | A1 * | 9/2010 | Kalwani et al. | 705/39 |
| 2011/0063132 | A1 * | 3/2011 | Trum | 340/932.2 |
| 2011/0099126 | A1 * | 4/2011 | Belani et al. | 340/932.2 |
| 2012/0056758 | A1 * | 3/2012 | Kuhlman et al. | 340/932.2 |
| 2012/0161986 | A1 * | 6/2012 | Amir | 340/932.2 |
| 2012/0184298 | A1 * | 7/2012 | Moons et al. | 455/456.2 |
| 2012/0203600 | A1 * | 8/2012 | Fiorucci et al. | 705/13 |
| 2012/0265874 | A1 * | 10/2012 | Hoh et al. | 709/224 |
| 2012/0299749 | A1 * | 11/2012 | Xiao et al. | 340/932.2 |
| 2013/0257632 | A1 * | 10/2013 | Harber et al. | 340/932.2 |
| 2013/0268187 | A1 * | 10/2013 | Scofield et al. | 701/400 |

* cited by examiner

*Primary Examiner* — Eric M Blount

(74) *Attorney, Agent, or Firm* — Daniel J. Swirsky; AlphaPatent Associates Ltd.

(57) ABSTRACT

A parking system including a database having (a) a number of parking spaces in a zone, (b) a ratio having a number of vehicles using a certain parking service from a pre-defined general population divided by a number of vehicles of the pre-defined general population, and (c) a number of vehicles using the parking service and which are currently parking in the zone, and a calculator configured to calculate from the database an estimation of available parking spaces within the zone, thereby enabling a user to obtain information regarding availability of parking spaces in given locations, compared with other locations.

17 Claims, 4 Drawing Sheets

80

| TIME | PARKING LOT | VEHICLE NUMBER | ENTRANCE TIME | PARKING DURATION |
|---|---|---|---|---|
| 14:02 | La Guardia | 56-932-06 | 11:01 | 3:01 |
| | | 72-001-57 | 10:30 | 3:32 |
| | | 12-903-65 | 10:00 | 4:02 |
| | | 14-065-04 | 09:45 | 4:17 |
| | King George | 60-405-01 | 13:40 | 0:22 |
| | | 79-606-03 | 13:22 | 0:40 |
| | | 75-619-17 | 10:01 | 4:01 |

PARKING METHOD AND SYSTEM

CROSS-REFERENCE TO RELATED PATENT APPLICATIONS

This application claims the benefit of priority from U.S. Provisional Application No. 61/694,272, filed Aug. 29, 2012, the entire contents of which is incorporated herein by reference.

FIELD OF THE INVENTION

The current invention involves a parking method and system. To be more precise, the current invention involves a parking method and system that facilitates an informed calculation of the availability of parking.

BACKGROUND OF THE INVENTION

A lack of parking space currently exists in many cities around the world. Finding available parking spaces at any hour is a difficult task for drivers.

Currently there are systems that make it possible to pay for parking through smartphones. These systems are applied by commercial services such as "Pango+", and "Cell O Park Advanced Parking Systems" in Israel.

Under the current systems, after the vehicle arrives to the parking lot, or another parking space, the user pays for parking by a telephone through the existing credit payment systems, instead of manually with coins. In these systems, the driver does not know in advance whether there is a parking space for his vehicle at the parking lot or at the street that he is driving to. The driver may arrive at the parking lot or to his destination, only to discover that there are no empty parking spaces, and that he cannot park his vehicle there.

All the methods described above have not yet provided satisfactory solutions to the problem of finding an available parking space.

It is an object of the present invention to provide a system for parking.

It is an object of the present invention to provide a method for parking.

It is an object of the present invention to provide a solution to the above-mentioned and other problems of the prior art.

Other objects and advantages of the invention will become apparent as the description proceeds.

SUMMARY OF THE INVENTION

In one aspect, the present invention is directed to a parking system, comprising:

a database comprising:

(a) a number of parking spaces in a zone (15, 35, 40);

(b) a ratio, comprising a number of vehicles using a certain parking service from a pre-defined general population, divided by a number of vehicles of the pre-defined general population; and (c) a number of vehicles using the parking service and which are currently parking in the zone; and a calculator configured to calculate from the database an estimation of available parking spaces (10) within the zone;

thereby enabling a user to obtain information regarding availability of parking spaces in given locations, compared with other locations.

The estimation of available parking spaces (10) within the zone may comprise "M−N*W", wherein:

"M" is the number of parking spaces in the zone;

"W" is the ratio; and

"N" is the number of vehicles using the parking service and parking in the zone.

The zone (15, 35, 40) may comprise parking spaces, streets of a city, or parking lots.

The system may be configured to send the user a recommended parking location and price thereof, updated in real time or at a future time.

The system may be configured to report a parking price to the user according to a calculation of a differential fee, depending on the parking load by area, and specific time of parking in real time or at a future time.

The system may be configured to identify times when there is a shortage of available parking spaces (10) in the area, and thereby to determine the differential parking fee, so that the fee increases when there are fewer available parking spaces (10) at the zone (15, 35, 40), and decreases when there are more available parking spaces (10) at the zone.

The system may be configured to report to the user.

The vehicles of the users may use a system containing a GPS through the users' mobile phones (50).

The system may comprise a database of the parking service provider, and facilitates a connection with the current system.

The database of the parking service provider may comprise "Pango+", or "Cell O Park Advanced Parking Systems".

The system may be configured to direct the user's vehicle (20) through a selected route in the city streets (30), thereby directing the user close to his destination and to an available parking space (10).

In another aspect, the present invention is directed to a parking method, comprising the steps of:

providing a database comprising:

(a) a number of parking spaces in a zone (15, 35, 40);

(b) a ratio, comprising a number of vehicles of pre-defined general population using a certain parking service divided by a number of vehicles of the pre-defined general population; and (c) a number of vehicles using the parking service and which are currently parking in the zone; and calculating from the database an estimation of available parking spaces (10) within the zone;

thereby enabling a user to obtain information regarding availability of parking spaces in given locations, compared with other locations.

The parking method may further comprise the step of:

sending the user a recommended parking location and price thereof, updated in real time or at a future time.

The parking method may further comprise the step of:

reporting the user a parking price thereof, according to a calculation of a differential fee, depending on the parking load by area, and specific time of parking in real time or at a future time.

The parking method may further comprise the step of:

identifying times when there is a shortage of available parking spaces (10) in the area, and thereby determining the differential fee, so that the fee increases when there are fewer available parking spaces (10) at the zone (15, 35, 40), and decreases when there are more available parking spaces (10) at the zone.

The parking method may further comprise the step of:

facilitating a connection with a database of the parking service.

The parking method may further comprise the step of:

directing the user's vehicle (20) through a selected route in the city streets (30), thereby directing the user close to his destination and to an available parking space (10).

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

BRIEF DESCRIPTION OF THE DRAWINGS

Embodiments and features of the present invention are described herein in conjunction with the following drawings.

Figure 1:
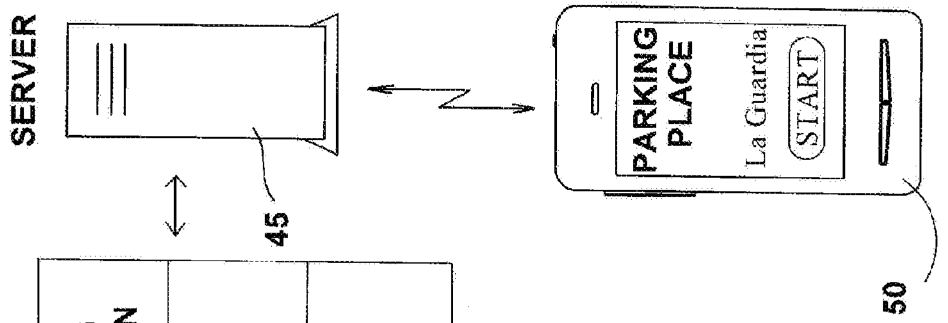
FIG 1 PRIOR ART
FIG. 1 is a two-dimensional diagram of a prior art parking service provider, such as the "Pango+" system for parking payment.

It should be understood that the drawings are not necessarily drawn to scale.

DETAILED DESCRIPTION OF THE INVENTION

The present invention will be understood from the following detailed description of preferred embodiments, which are meant to be descriptive and not limiting. For the sake of brevity, some well-known features, methods, systems, procedures, components, circuits, and so on, are not described in detail.

The present invention involves a parking system that provides:

(A) Finding an available parking space for a vehicle with an advance statistical knowledge that there is a high probability of finding empty parking spaces in a parking lot or a street, based on a calculation of the number of vehicles registered through certain payment systems, such as "Pango+", or any other parking service provider, and based on a statistical approximation with the fixed ratio of the number of registered vehicles paying for parking through "Pango+" or "Cell O Park Advanced Parking System", for example, to the number of vehicles that do not use these systems to pay for parking. For example, assume that a parking lot (or a street) contains 100 parking spaces, and that 30 vehicles are parked there through the "Pango+" system. If the statistical ratio of "Pango+" users to other drivers is, say, 1 "Pango+" driver to 1 other driver, then since 30% of the parking spaces are occupied by "Pango+" drivers, and the ratio of "Pango+" drivers to other drivers is 1:1, a crude estimate is that there are 30 more parking spaces taken by non-"Pango+" drivers, and it is therefore reasonable to assume that 40% of the spaces in the parking lot (or street) are available, i.e., there are about 40 available parking spaces in the parking lot (or street).

(B) The system identifies and monitors times when there is a shortage of available parking spaces in various areas and at various times, and makes it possible to pay a differential parking fee, so that the fee increases when there are fewer parking spaces available at the parking lot (or area), and decreases when there are more parking spaces available at the parking lot (or area). This feature can be achieved through a technology for processing information about the number of available parking spaces in a parking lot (or a defined area) in real time, or at a future time. This means, for example, that the user can know that there will be available parking spaces at a given parking lot (or parking area) one hour from now, at a predetermined price for that time.

The calculation referred in here is an estimation of an entire, which is carried out by a sample thereof.

As an example only for understanding the logic of the calculation that is used in the method and system of the present invention, we can see that if the quantity of smartphone users in a given area (for example, in a basketball hall) can be sampled, and it is known that 30% of cellphone users are using smartphones, then the number of cellphone users in a hall can be used to obtain an approximation of the total number of people in that hall.

A similar calculation can be made for estimating the number of available parking spaces within a parking lot (or a street). If it is known that 30% of mobile phone users use a smartphone, and it is possible to know the number of smartphone users in the parking lot, then the number of people (or vehicles in a similar calculation) within that parking lot can be estimated. Using that similar calculation, since the number of parking spaces contained in the lot (or street) is known, it is possible to assess whether or not there are available parking spaces in that parking lot (or street).

According to one embodiment, the parking method and system according to the present invention informs the driver about both available parking spaces and the real time price, and about the future availability and price of parking spaces. The parking method and system according to the present invention can be hooked up to a "Pango+" or a "Cell O Park" system, for example.

For an example, the process of finding a parking through one embodiment of the parking system according to the present invention can work as follows:

The driver is in the city of Los Angeles, for example, on his way to the city center.

The driver opens his cellular application and tells it that he is on his way to the city center.

The system scans the state of parking in the city center area.

The system formulates estimations using statistical calculations defined within the system according to the figures of the number of parking spaces in a parking zone, the number of vehicles parked there in real time or at a future time using the application method and based on data from the "Pango+" parking service provider, for example, and on the ratio of "Pango+" users to other drivers within a pre-defined population. According to these figures, the system according to the present invention calculates where the driver will most likely find a parking in real time or at a future time.

According to one embodiment of the present invention, a formula can be given for calculating the expected number of available parking spaces within a defined zone, an area, a street, or a parking lot. Such a formula for calculating the expected number of available parking spaces is:

$$F=M-(N*100)/Z$$

The parameters used in the formula above are signified by the following variables:

F=the estimation of the number of available parking spaces within the defined zone (or street).

M=the total number of authorized parking spaces within the defined zone (or street).

N=the number of vehicles parking (at real time) within the defined zone (or street) using a certain parking service provider (such as "Pango+", or "Cell O Park", etc.).

Z=the percentage of vehicles using that certain parking service provider (such as "Pango+", or "Cell O Park", etc.) within the general population.

The "population" refers herein, may mean the set of licensed vehicles in a country or a state, it may mean the set of vehicles registered or owned by the inhabitants of a certain city, it may mean the set of vehicles registered for traffic within a certain area, etc., and will be referred herein as the "general population" for the statistical calculation. (Such a set may be defined by all registered vehicles in the department of transportation in a certain geographical region. Alternatively, a statistical evaluation can be done for determining an ideal set as a pre-defined population for best statistical results).

In order to show an example for a calculation of the number of estimated available parking spaces in a street, we will take the variables to be as follows: We will take the street to contain 500 parking spaces (that is, M=500), we will suppose that the number of vehicles using the certain parking service provider that are parking in that street is 10 (N=10), and we will say that the percentage of vehicles that use the selected parking service provider within the general population is 5% (Z=5). In order to find the estimated number of available parking spaces (F) within that street, we will place all variables within the formula:

$$F=500-(10*100)/5$$

$$F=500-200$$

$$F=300$$

Therefore, the expected number of available parking spaces in that street is 300. (The street has a total of 500 authorized parking spaces, of which 200 spaces are expected to be occupied, and therefore 300 spaces are predicted to be available).

For a compact presentation of the same calculation, instead of using a formula with the percentage of vehicles using a certain parking service (such as "Pango+") within the general population, we can express the ratio of vehicles of users of a certain parking service to the pre-defined general population by a notation of the form "X:Y" (where "X" stands for vehicles of users of the parking service, and "Y" stands for the general population). In this way, we can express the ratio of "X:Y" with a parameter, such as "W". Here, were "W" is the ratio X:Y, we can use a compact formula of the form:

"$F=M-N*W$"

were F is the estimation of the number of available parking spaces within the zone;

M is the total number of authorized parking spaces within that zone;

N is the number of vehicles parking (at real time) within that zone using a certain parking service (such as "Pango+"); and W is, as said here, the ratio X:Y (of vehicles of users of the parking service to the total number of vehicles in the pre-defined general population).

Accordingly, such a compact expression for calculating the value of the estimated number of available parking spaces in a zone would be:

"M−N*W".

FIG. 1 is a two-dimensional diagram of a prior art parking service provider, such as the "Pango+" system for parking payment.

In the prior art parking service provider, a payment for parking can be done with a cellular application which is installed in a user's mobile phone 50. A user can pay for parking with his mobile phone, by inserting information into the cellular application, and sending his payment request to the parking service provider's server 45. The information sent includes the starting time of parking, the parking lot (or street) name, the vehicle number, and may also include other information regarding the payment and the personal details of the user.

Upon arrival at the parking lot, a user is asked to send a parking payment request from his mobile phone 50 to the parking service provider's server 45. The information of the starting time of parking for each of the parked vehicles, the names of the parking lots (or streets) these vehicles are parked in, the durations of parking and the vehicles numbers are all kept at database 80 that is coupled with server 45. When the parking of a vehicle ends and a driver is about to drive the vehicle away, he sends an ending announcement to server 45, and the payment for the parking is transferred, according to the duration of parking and the cost per each minute of parking.

For example, according to the figure of the prior art in this diagram, at a given time 14:02, four vehicles of users of the "Pango+" parking service provider are parking their vehicles using the "Pango+" service in "La Guardia" parking lot. According to this example, vehicle number 56-932-06 is parking at the "La Guardia" parking lot from 11:01, that is, for three hours and one minute. At the end of the parking session, the driver of vehicle number 56-932-06 will send a notification of ending his parking, and the parking service provider of the prior art will bill the user's account according to the time of parking he reported, multiplied with the cost of parking per each minute of parking according to the tariff at the "La Guardia" parking lot.

Likewise, in this example, three vehicles of users of the "Pango+" parking service are parking their vehicles using the "Pango+" service in "King George" parking lot. In this example, according to database 80, vehicle number 60-405-01 is parking for twenty-two minutes at "King George" parking lot.

Figure 2:
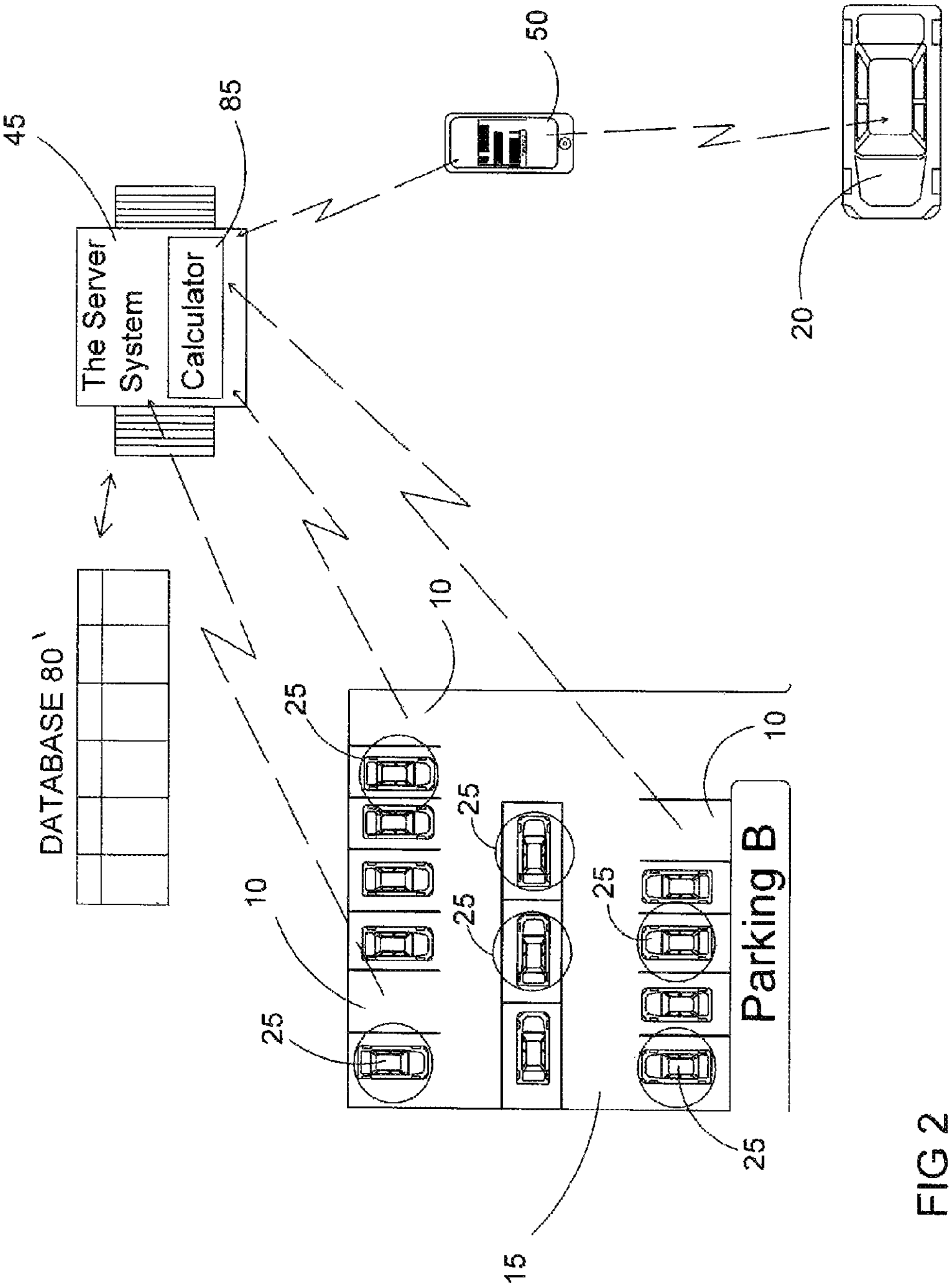
FIG. 2 is a two-dimensional diagram of the working method of a parking system according to one embodiment of the present invention.

FIG. 2 is a two-dimensional diagram of the working method of a parking system according to one embodiment of the present invention.

This figure shows the general components and the working method of a parking system, according to one embodiment of the present invention. The figure shows "Pango+" parking service users 25 parking in a parking zone 15 and transmitting their location to the server 45. Server 45 includes a calculator 85 for executing calculations. Calculator 85 of server 45 performs the user's calculation in comparison with the pre-defined population and with the number of spaces in the zone, and provides an estimate of the number of available parking spaces 10 in the zone. A database 80' is coupled with server 45. Database 80' stores the information obtained from a certain parking service provider such as "Pango+". In addition to the data about the vehicles numbers and their entrance time to the parking places, database 80' also contains information regarding the total number of authorized parking spaces in each defined parking zone, in each street, or in each parking lot. With the data regarding the current number of vehicles parking in each parking zone (or street) obtained from the parking service provider with each incoming parking request of a user, the known numeric value of the percentage of vehicles that are using that certain parking service provider within the general population, and the total number of parking spaces in each parking zone (or street), the parking method and system according to the invention calculates an estimation of the number of available parking spaces in the parking zone (or street) and sends a notification to the user's mobile phone 50. Server 45 transmits the information regarding the estimated number of available parking spaces to the user's mobile phone 50.

According to one embodiment of the invention, server 45 transmits directions of driving to the user's mobile phone 50, in order to direct his vehicle 20 to the parking zone 15.

According to another embodiment of the invention, server 45 sends to the mobile phone 50 of a user a recommended destination for parking (a parking lot name or a street address), according to a prediction regarding the availability of parking spaces based on a comparison between availability of parking spaces in different parking zones or streets within a given area.

Figure 3:
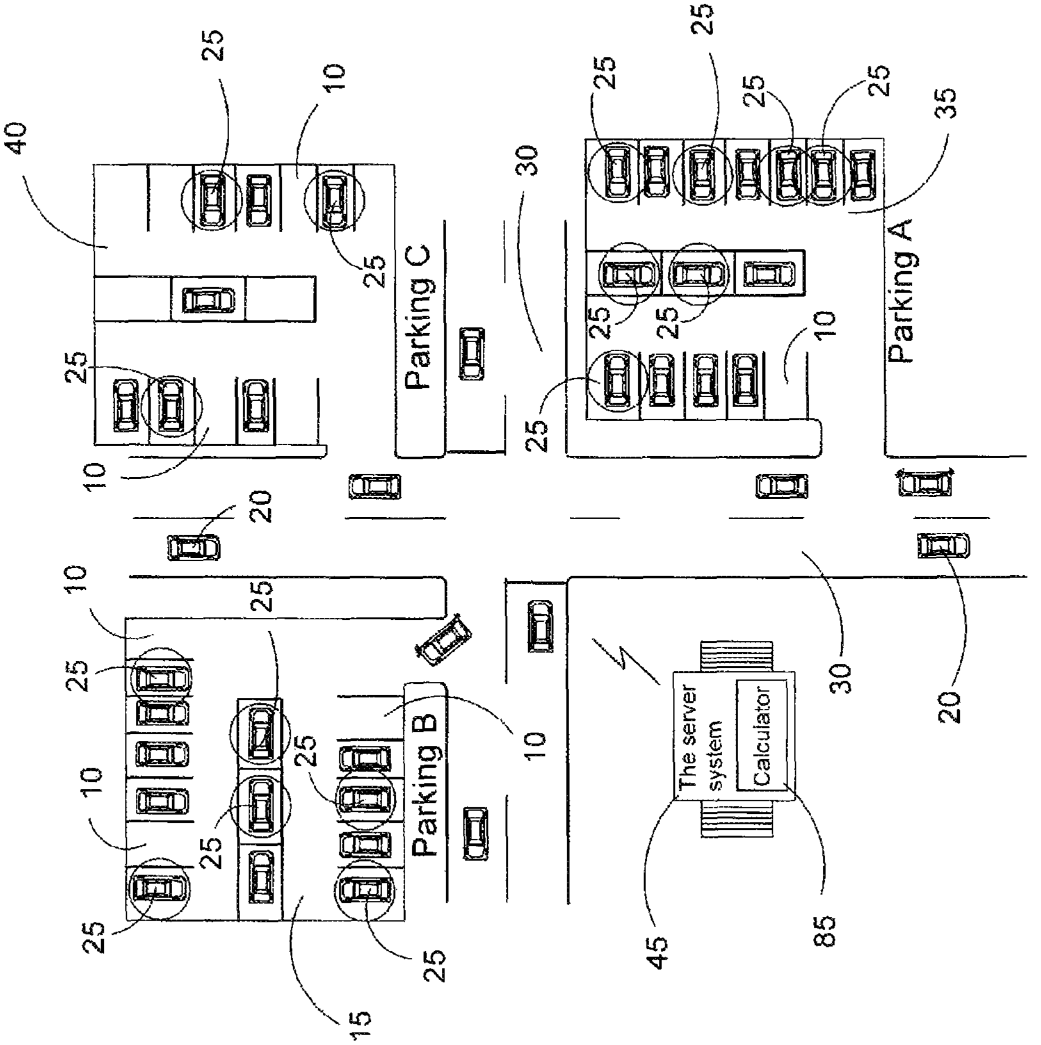
FIG. 3 is a two-dimensional diagram of a parking method and system according to one embodiment of the present invention.

FIG. 3 is a two-dimensional diagram of a parking method and system according to one embodiment of the present invention.

This diagram describes the city streets 30 and the movement of vehicles in it, where some of the drivers use the "Pango+" service provider to pay for parking. The driver in vehicle 20 receives a recommendation from the server 45 to park in zone 40, that is based on the assumption that there are available parking spaces 10 in zone 40, which is obtained from the number of "Pango+" service provider users 25 (in each of the zones) compared with their number in the predefined general population and subtracted from the number of spaces in zones 15, 35, and 40, in each case of the calculation. The system directs the user's vehicle 20 through a selected route in the city streets 30, taking him close to his destination, and also close to a parking space with a high probability of being available.

We will take as an example the calculation of the estimated number of available parking spaces in each of the zones 15, 35, and 40, illustrated in FIG. 3, according to the formula given above. A user who has sent a destination area for parking that is defined within the borders of FIG. 3, will have a choice between three parking zones: 15 (parking B), 35 (parking A), or 40 (parking C), and he will want to know in which of the three zones there is a better chance to find an available parking space.

According to one embodiment of the present invention, the parking system calculates the estimated number of available parking spaces in each of the zones 15 (parking B in FIG. 3), 35 (parking A), and 40 (parking C), using the formula: "F=M−(N*100)/Z".

To give an example for calculating the expected number of available parking spaces in each of the zones 15 (parking B), 35 (parking A) and 40 (parking C), we will take the percentage of the vehicles using a certain parking service provider (such as "Pango+") within the general population to be 50%. (That is, the ratio of vehicles of drivers that use a certain parking service provider to the vehicles of drivers that do not use this parking service provider is 1:1). Therefore, the variable "Z" in the above formula will be given a value of "50". For each of the zones 15, 35 and 40, the calculation will be as follows:

In zone 15 (parking B) of FIG. 3 we can see a total number of 15 parking spaces in the zone. Therefore, the variable "M" in the formula will be given a value of "15". We see that in parking B there are 6 vehicles of users 25 of a certain parking service provider such as "Pango+". Therefore, the variable "N" in the above formula will be given a value of "6". Now, by placing the numeric values in the variables of the formula "F=M−(N*100)/Z", we get the equation:

$$F=15-(6*100)/50$$

The solution of the equation is:

$$F=15-12$$

$$F=3$$

Therefore, the estimation for the number of available parking spaces in parking B is three available spaces. And, according to this example, we can see that the estimation calculated with the formula based in this example on the percentage of users of a certain parking service provider to be 50% and the number of users of this parking service provider in parking B to be 6, that the estimation for the number of available parking spaces was accurate, and that there are indeed three available parking spaces 10 in parking B.

In zone 35 (parking A) of FIG. 3 we can see a total number of 15 parking spaces. Therefore, the variable "M" in the formula will be given a value of "15". We see that in parking A there are 7 vehicles of users 25 of a certain parking service provider such as "Pango+". Therefore, the variable "N" in the above formula will be given the value "7". Now, by placing the numeric values in the variables of the formula "F=M−(N*100)/Z", we get the equation:

$$F=15-(7*100)/50$$

The solution of the equation is:

$$F=15-14$$

$$F=1$$

From the solution of the equation we see that in parking A we expect to find only one available parking space. And indeed, in this example, we find that there is one available parking space 10 in zone 35.

In zone 40 (parking C) of FIG. 3, we also see a total number of 15 parking spaces (M=15) in the zone. Now, we see that in parking C there are 3 vehicles of users of a certain parking service provider such as "Pango+" (N=3). By placing the values in the variables of the formula, we get the equation:

$$F=15-(3*100)/50$$

The solution of the equation is:

$$F=15-6$$

$$F=9$$

Therefore, the estimation for the number of available parking spaces in parking C is nine available parking spaces. According to this example, we can see that there are actually eight available parking spaces 10. However, the estimation of nine available parking spaces in zone 40 is still very close to the actual number of eight available parking spaces.

If we take the three zones in this example (parking A, B and C), then we see that according to the estimations derived from the data in the parking method and system calculated with the above formula, a reasonable prediction would be to look for a parking space in parking C. (According to the example above, the estimation is that parking A has one available parking space, parking B has three available parking spaces, and parking C has nine available spaces. Therefore, it is reasonable to direct the user who looks for parking to parking C). Based on the estimations, a direction is sent from server 45 to the mobile phone 50 of the user, directing him to zone 40 (parking C), which according to the estimations has the biggest probability for an available parking space 10.

Figure 4:
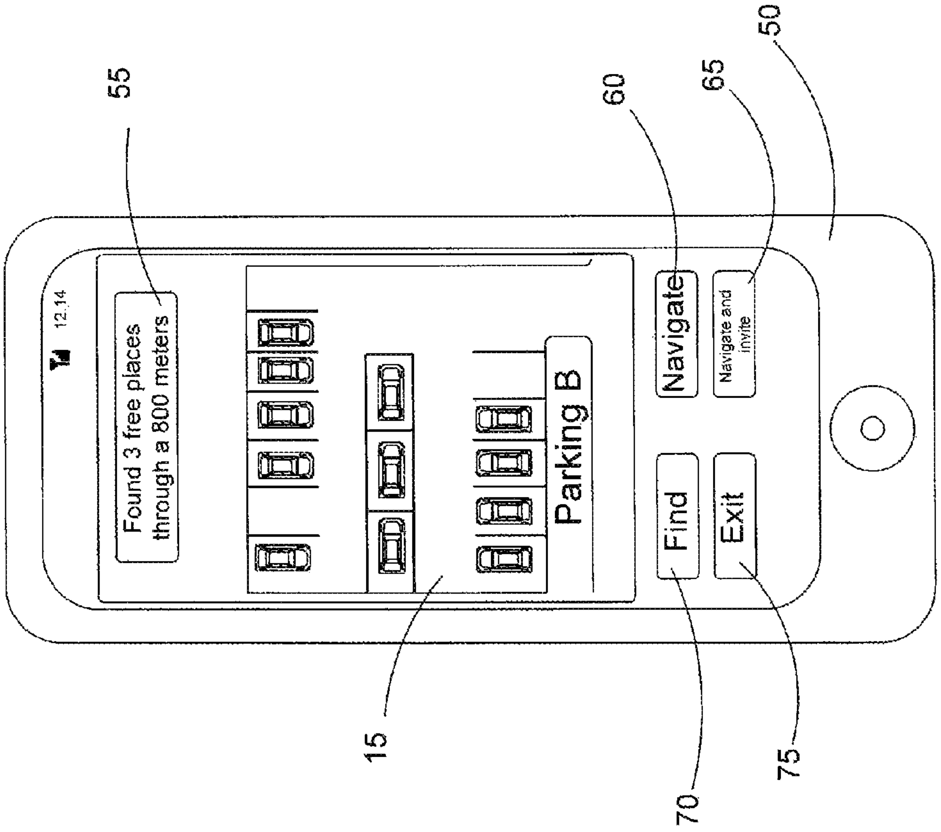
FIG. 4 is a two-dimensional diagram of a mobile phone of a user of a parking method and system according to one embodiment of the present invention.

FIG. 4 is a two-dimensional diagram of a mobile phone of a user of a parking method and system according to one embodiment of the present invention.

The diagram shows that the system's server found a number of parking spaces near the requested address, and sent a recommendation 55 to the user's mobile phone 50, and also displayed a map of zone 15.

According to another embodiment of the present invention, a display of the user's mobile phone 50 may be the same as a GPS display and will contain a guidance button 60, a search button 70, and two other buttons: a button for ordering parking 65, based on the price for peak hours, which will therefore guarantee that there will always be parking, and an exit button 75, which will end billing when the vehicle leaves the parking.

According to another embodiment, the parking method and system according to the present invention reports the parking price to the driver according to its calculation of the differential price, depending on the parking load by area, and specific time of parking in real time or at a future time.

According to another embodiment of the present invention, the parking method and system report to both the vehicle driver and to the server.

According to another embodiment of the present invention, the vehicles in the parking method and system are hooked up to a system containing GPS through the users' mobile phones 50.

According to another embodiment of the present invention, the parking method and system contains a database of at least one of the parking service providers, and facilitates access to and a connection with the method and system of the present invention.

In the figures and/or description herein, the following reference numerals have been mentioned:

numeral 10 denotes an available parking space;
numeral 15 denotes a parking lot;
numeral 20 denotes a vehicle;
numeral 25 denotes "Pango+" system users;
numeral 30 denotes city streets;
numeral 35 denotes a parking lot;
numeral 40 denotes a parking lot;
numeral 45 denotes a server;
numeral 50 denotes a user's mobile phone;
numeral 55 denotes a recommendation;
numeral 60 denotes a guidance button;
numeral 65 denotes a button for ordering parking;
numeral 70 denotes a search button;
numeral 75 denotes an exit button;
numerals 80 and 80' denote a database; and
numeral 85 denotes a calculator.

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

What is claimed is:

1. A parking system, comprising:
a database comprising:
(a) a number of parking spaces in a zone;
(b) a ratio, comprising a number of vehicles using a parking service from a pre-defined general population, divided by a number of vehicles of said pre-defined general population; and
(c) a number of vehicles using said parking service and which are currently parking in said zone; and
a calculator configured to calculate from said database an estimation of available parking spaces within said zone;
thereby enabling a user to obtain information regarding availability of parking spaces in said zone.

2. A parking system according to claim 1, wherein said estimation of available parking spaces within said zone comprises "M−N*W", wherein:
"M" comprises said number of parking spaces in said zone;
"W" comprises said ratio; and
"N" comprises said number of vehicles using said parking service and parking in said zone.

3. A parking system according to claim 2, wherein said zone comprises a member selected from a group including: parking spaces, streets of a city, and parking lots.

4. A parking system according to claim 1, wherein said system is configured to send said user a recommended parking location and price thereof, updated in real time or at a future time.

5. A parking system according to claim 1, wherein said system is configured to report a parking price to said user according to a calculation of a differential fee, depending on the parking load by area, and specific time of parking in real time or at a future time.

6. A parking system according to claim 5, wherein said system is configured to identify times when there is a shortage of available parking spaces in said area, and thereby to determine said differential parking fee, so that said fee increases when there are fewer available parking spaces at said zone, and decreases when there are more available parking spaces at said zone.

7. A parking system according to claim 1, wherein said system is configured to report to said user.

8. A parking system according to claim 1, wherein the vehicles of said users use a system containing a GPS through said users' mobile phones.

9. A parking system according to claim 1, wherein said system comprises a database of said parking service provider, and facilitates a connection with said current system.

10. A parking system according to claim 9, wherein said database of said parking service provider is selected from the group comprising of: "Pango+", and "Cell O Park Advanced Parking Systems".

11. A parking system according to claim 1, wherein said system is configured to direct said user's vehicle through a selected route in the city streets, thereby directing said user close to his destination and to an available parking space.

12. A parking method, comprising the steps of:
providing a database comprising:
(a) a number of parking spaces in a zone;
(b) a ratio, comprising a number of vehicles of predefined general population using a parking service divided by a number of vehicles of said pre-defined general population; and
(c) a number of vehicles using said parking service and which are currently parking in said zone; and
calculating from said database an estimation of available parking spaces within said zone;
thereby enabling a user to obtain information regarding availability of parking spaces in said zone.

13. A parking method according to claim 12, further comprising the step of:
sending said user a recommended parking location and price thereof, updated in real time or at a future time.

14. A parking method according to claim 12, further comprising the step of:

reporting said user a parking price thereof, according to a calculation of a differential fee, depending on the parking load by area, and specific time of parking in real time or at a future time.

15. A parking method according to claim 14, further comprising the step of:

identifying times when there is a shortage of available parking spaces in said area, and thereby determining said differential fee, so that said fee increases when there are fewer available parking spaces at said zone, and decreases when there are more available parking spaces at said zone.

16. A parking method according to claim 12, further comprising the step of:

facilitating a connection with a database of said parking service.

17. A parking method according to claim 12, further comprising the step of:

directing said user's vehicle through a selected route in the city streets, thereby directing said user close to his destination and to an available parking space.

* * * * *